No. 729,915. PATENTED JUNE 2, 1903.
F. BEECHER.
MEAT SLICER.
APPLICATION FILED MAR. 28, 1902.
NO MODEL.
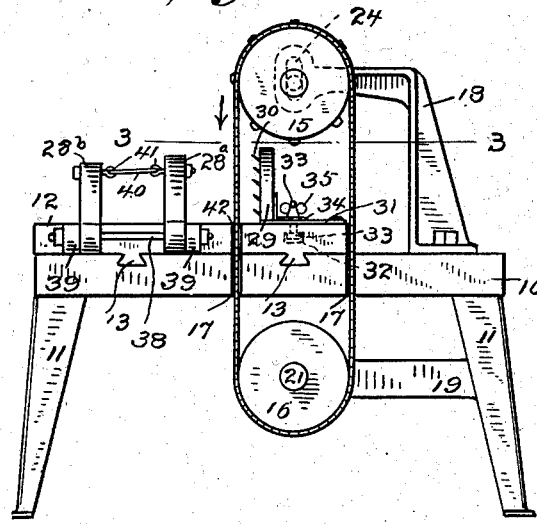
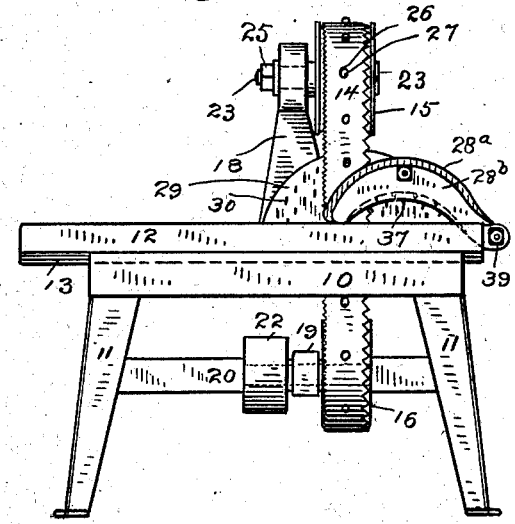
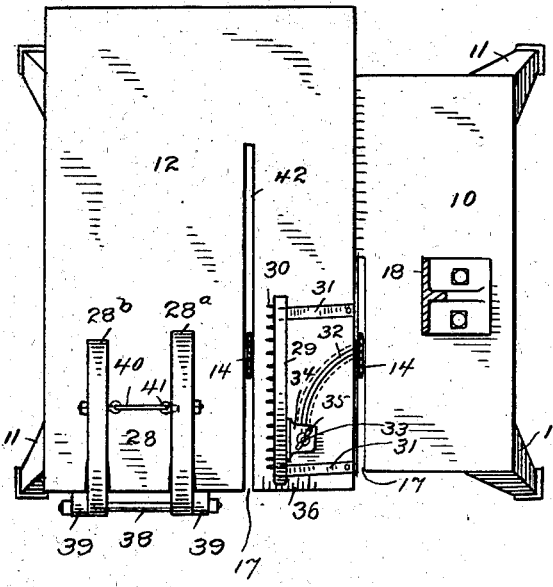
WITNESSES.
H. A. Lamb.
S. W. Atherton.
INVENTOR.
Frederick Beecher
By
A. M. Wooster
Atty.

No. 729,915. Patented June 2, 1903.

UNITED STATES PATENT OFFICE.

FREDERICK BEECHER, OF SEYMOUR, CONNECTICUT.

MEAT-SLICER.

SPECIFICATION forming part of Letters Patent No. 729,915, dated June 2, 1903.

Application filed March 28, 1902. Serial No. 100,411. (No model.)

*To all whom it may concern:*

Be it known that I, FREDERICK BEECHER, a citizen of the United States, residing at Seymour, county of New Haven, State of Connecticut, have invented a new and useful Meat-Slicer, of which the following is a specification.

My invention has for its object to provide a simple and inexpensive power-driven machine for slicing meat—as, for example, cutting steaks, cutlets, &c., and slicing ham. In order to provide a quick-acting and easily-operated machine that will cut the bone as well as the meat and in a mere fraction of the time ordinarily required for cutting a slice and sawing the bone, I have devised the novel machine which I will now describe, referring to the accompanying drawings forming part of this specification, and using reference characters to designate the several parts.

Figure 1 is an elevation of my novel machine as in use; Fig. 2, an elevation as seen from the left in Fig. 1; and Fig. 3 is a plan view, the saw and upper bracket being in section on the line 3 3 in Fig. 1.

10 denotes a table supported by legs 11. Said parts may be of metal or wood and of any ordinary or preferred construction.

12 denotes a sliding bed which is provided on its under side with dovetails 13, adapted to engage corresponding grooves in the table. Cutting is done by means of a band-saw 14, preferably provided with sets of relatively fine and coarse teeth on its opposite edges. The saw is carried by a pulley 15 above the table and a pulley 16 below the table and passes through slots 17 in the table and a corresponding slot 42 in the sliding bed. The upper pulley is shown as carried by a bracket 18, extending upward from the table, and the lower pulley by a bracket 19 below the table, which may be attached in any convenient manner, as to the table itself, to one of the legs, or to a cross-piece 20, as shown in the drawings. The lower pulley 16 is rigidly secured to a shaft 21, which is journaled in bracket 19 and carries at its other end a belt-pulley 22 to receive a driving-belt. (Not shown.) Pulley 15 is shown as journaled on a stud 23, which is adjustable in a slot 24 in bracket 18. When it is desired to remove, to turn, or to adjust the saw, the stud is loosened in the slot by means of a nut 25 and the saw after adjustment is locked in position by tightening up the nut again on the stud. In order to render it impossible for the saw to slip in use, I preferably provide the saw with equidistant openings 26 and provide one or both of the saw-carrying pulleys—upper pulley 15, as shown in the drawings—with lugs 27, which are so shaped as to pass into the openings freely and hold the saw against slipping. The piece of meat to be operated upon is retained in position on the sliding bed by means of a holder 28 and a gage 29. The gage consists of a vertical plate having upwardly-extending oblique prongs or teeth 30 and adapted to swing on pivoted arms 31. The bed is provided with a curved undercut groove 32. The head of a bolt 33 lies in this groove, the shank of said bolt extending upward through the neck of the groove and through a plate 34, which extends rearwardly from the gage. A wing-nut 35, engaging the bolt and bearing against the plate, acts to draw the head of the bolt against the walls of the undercut groove, and thus locks the gage at any desired adjustment. A scale 36 may be provided on the sliding bed at the right of the slot 17, through which the operative portion of the saw passes to indicate the distance from the saw to the surface of the gage, and thus enable the operator to set the gage to make slices of any desired thickness. The holder consists of two arms, (specifically indicated by $28^a$ and $28^b$.) These arms are preferably curved, substantially as shown in the drawings, and are shown as provided on their under sides with prongs 37, which engage a piece of meat and assist in retaining it in position. Arm $28^b$ is preferably made lower than arm $28^a$, to enable it to hold better the shank of a quarter or a small-sized piece of meat. The arms are shown as pivoted on a rod 38, carried by ears 39 at the end of the sliding bed. This rod may be used as a handle in drawing back the bed in use. In order to provide a relatively rigid but flexible brace between the arms of the holder, I have shown said arms as connected by means of a rod 40, the ends of which are hooked into eyes 41 in the arms. This connection retains the arms in position relatively to each other, but gives ample movement for each arm independently of the other.

In use the operator loosens wing-nut 35 and swings the gage by means of pivoted arms 31, so as to place the surface of the gage at the required distance from the saw, as indicated by the scale, to cut slices of any desired thickness, and then tightens up the nut to lock the gage in place. The sliding bed is then drawn backward away from the saw and the piece of meat to be sliced is laid against the gage and is held securely in position by turning the arms of the holder over upon it. It will be noted that the said arms are held in engagement with the meat by gravity, whereby they are free to yield to the inequalities of the meat. Power is then applied and the sliding bed, with the piece of meat thereon, is pushed forward against the saw, which is allowed to pass entirely through it, the severed slice of meat remaining upon the gage, as it will be held there by the upwardly-extending prongs until removed by the operator. To cut another slice of meat, the operation is repeated as before.

Having thus described my invention, I claim—

1. A meat-slicer comprising a band-saw, a sliding bed having an undercut groove or guideway, a gage adapted to hold the material to the work, parallel equal arms pivoted to said bed and said gage, a plate extending from said gage, a bolt working in said plate and having its head projected into said undercut groove, a nut engaging said bolt and bearing against said plate, and a meat-holder carried by said bed.

2. A meat-slicer comprising a band-saw, a sliding bed, a gage carried thereby, and a meat-holder comprising two curved members pivoted to said bed and yieldingly engaging the meat, said members being connected by a flexible brace.

3. A meat-slicer comprising a band-saw, a sliding bed, a gage carried thereby, and a meat-holder comprising two curved members pivoted to said bed and yieldingly engaging the meat, said members being provided with eyes or sockets, and a rod having hooked ends engaging said eyes or sockets.

4. A meat-slicer comprising a band-saw, a sliding bed, a gage carried thereby, ears projecting from one end of said bed, a rod mounted therein and serving as a handle to facilitate the return of said sliding bed, holding members pivotally mounted on said rod and yieldingly engaging the meat, and a flexible brace connecting said members.

In testimony whereof I affix my signature in presence of two witnesses.

FREDERICK BEECHER.

Witnesses:
JAMES SWAN,
ALBERT SWAN.